Nov. 4, 1947.    J. A. HUNT ET AL    2,430,401
GAS COMPRESSOR
Filed June 26, 1945    2 Sheets-Sheet 2
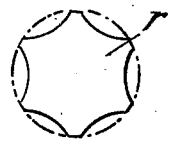 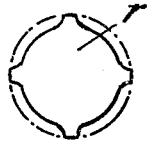 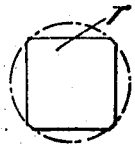
Fig. 3.   Fig. 2.   Fig. 4.
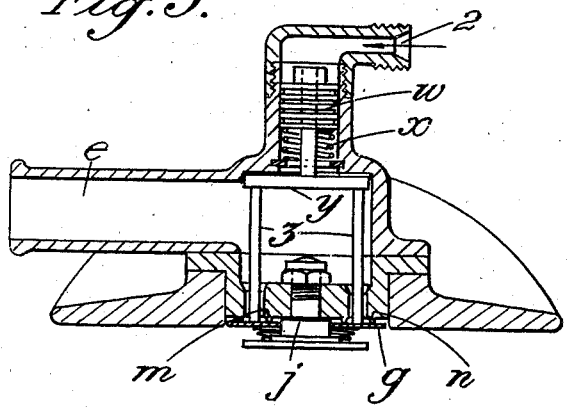
Fig. 5.
Inventors
J. A. Hunt
A. E. Moreillon
By Glascock Downing Seibold
Attys.

Patented Nov. 4, 1947

2,430,401

UNITED STATES PATENT OFFICE 2,430,401

GAS COMPRESSOR

Joseph Anthony Hunt and Albert Edmund Moreillon, Redditch, England, assignors to The Heywood Compressor Company Limited, Redditch, England, a British company Application June 26, 1945, Serial No. 601,592
In Great Britain June 8, 1944

5 Claims. (Cl. 230—26)

This invention relates to two stage high speed air or gas compressors of the single cylinder or co-axial cylinder type and has for its object to provide an improved arrangement and construction of the air inlet and transfer valves which will enable high volumetric efficiency or high performance to be obtained particularly in small size compressors as used upon vehicles, and particularly upon aircraft, to provide the motive power for operating inter alia, accessories or auxiliary equipment.

In accordance with our invention, we utilise an automatic type of inlet and transfer valve comprising a relatively thin lightweight disc and we provide the inlet valve or each of the inlet valves upon the cylinder head so that it projects within the cylinder, and when the piston is approaching its top dead centre position passes into a recess in the piston so that the piston top can be brought as close to the cylinder head as is allowable having regard to mechanical considerations. A transfer valve is also located in the or each recess in the piston top and the air passing to the annular space around the piston for the second stage of compression is divided into relatively small streams directed through passages (which may be tangential to the cylinder wall) in the piston on to the cylinder wall all round the cylinder so that the air is subjected to a maximum cooling effect by the relatively cool wall. The cylinder may be air or water cooled.

Referring to the accompanying explanatory drawings—

Figures 2, 3 and 4 are plan views of transfer valves suitable for use in the Figure 1 construction.

Figure 5 is a sectional view of a relay valve suitable for off-loading the compressor inlet valve. This figure is drawn to a smaller scale than Figure 1.

Figure 1:
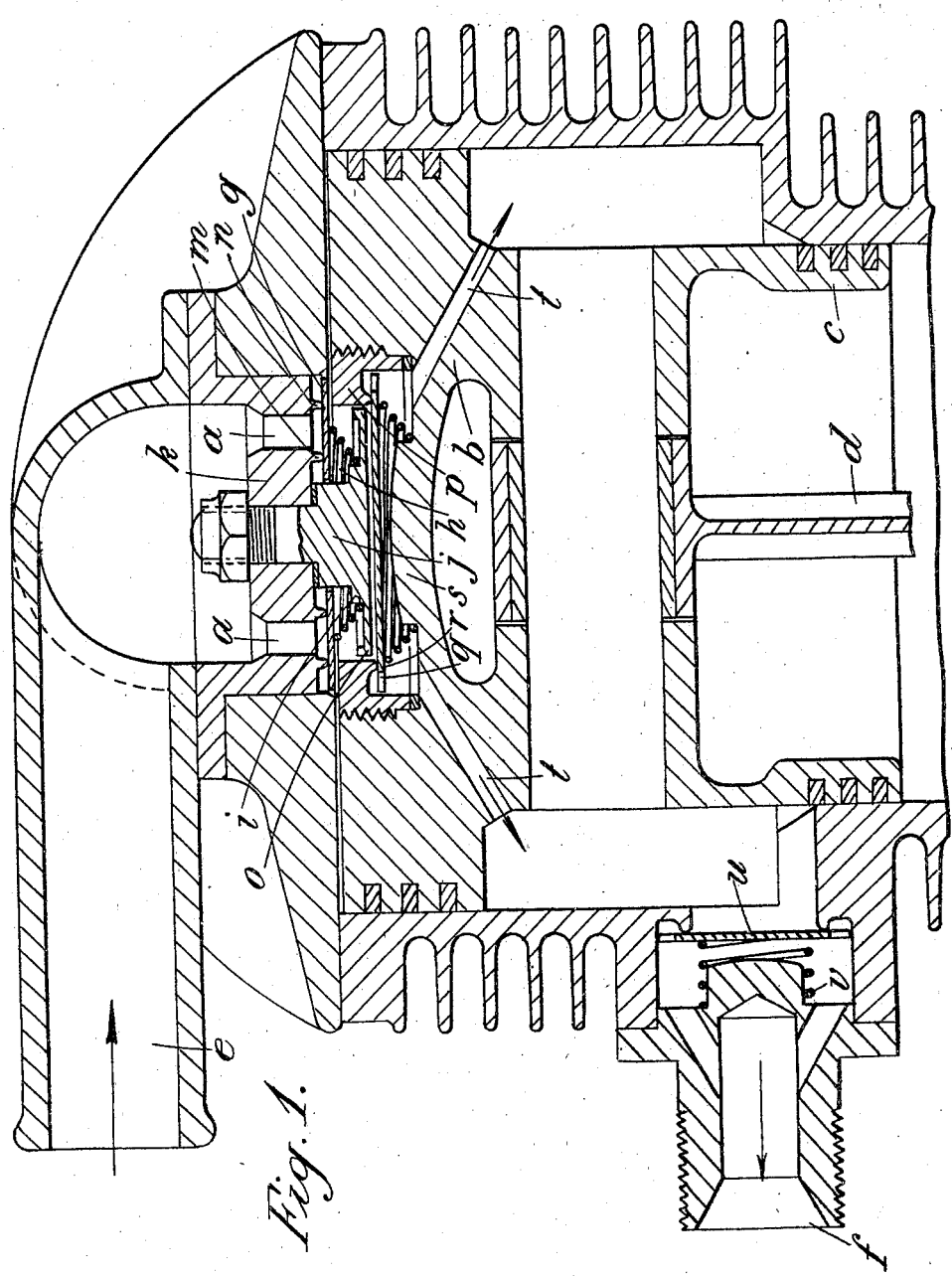
Figure 1 is a sectional elevation of the upper part of a two stage compressor having inlet and transfer valves constructed and arranged in one convenient form in accordance with this invention.

The compressor comprises a piston having a larger diameter portion $b$ and a smaller diameter portion $c$, the piston being reciprocated by the connecting rod $d$ from a crank shaft (not shown). $e$ is the air inlet branch and $f$ the air delivery branch.

Each inlet valve comprises a seating block $k$ secured in the cylinder head, having two co-axial seating rings or surfaces $m$, $n$ with a series of holes $a$ through the block which come between such seating rings. The valve proper comprises a thin annular plate $g$ adapted to seat on the seating rings and supported against such rings by a tapered coil spring $h$, the larger end of the spring bearing against the valve in a position approximately between the seating rings, and the smaller end being located in a recess around a shoulder $i$ on a part $j$ (bolted to the inlet valve seating block $k$) which also locates the annular valve plate through which it passes. When the valve plate $g$ is fully open and its spring $h$ fully compressed, the inner edge of the valves comes against the top of the shoulder $i$ before referred to but the outer edge of the valve is unsupported until it has flexed beyond a predetermined limit, so that the valve can flex or bend slightly between its inner and outer peripheral edges, if necessary, within the elastic limits of the material of which it is made, when opening at high speed, so providing a damping action which prevents damage to the valve.

The head $o$ of the part $j$ comes within a recess in the piston head in which is secured the transfer valve seating ring $p$. The transfer valve $q$ is a thin disc which in plan view may be of any of the shapes shown in Figures 2, 3 and 4. It is shaped or cut away around its peripheral edge to allow for the passage of air into the recess in the piston whilst allowing the peripheral wall of the ring $p$ to guide the valve disc in its opening and closing movements. The valve disc $q$ is supported by the large end of a tapered coil spring $r$, the smaller end of which is located around a projection $s$ on the piston within the recess. We provide a dome shaped cap on such projection $s$ which forms a stop for the centre of the transfer valve $q$ when it opens, so allowing the valve to flex from the centre to its edge to give a damping effect.

The air which passes the transfer valve $q$ for the second stage of compression is divided into relatively small streams directed through passages $t$ in the piston on to the cylinder wall all round the cylinder so that the air is subjected to a maximum cooling effect by the relatively cool wall. The cylinder may be air or water cooled.

The delivery valve $u$ is a thin disc loaded by the spring $v$.

Figure 5 shows a modified arrangement of an air inlet branch which incorporates a relay in the form of a piston $w$ supported by the spring $x$ and connected to a crosshead $y$ having prongs or pokers $z$ thereon adapted when the pressure applied to the piston $w$ through the branch 2 overcomes the spring $x$, to hold the inlet valve disc $g$ off its seating rings $m$ and $n$ so that the compressor is "unloaded" or "off loaded."

In some cases parts of several inlet valve fittings may pass into a recess in the piston top or head. There may be one or more transfer valves in such recess.

What we claim is:

1. In a two stage high speed gas compressor, the combination of a cylinder, at least one automatic inlet valve arranged on the cylinder head, having a valve closure member in the form of a relatively thin light weight disc, a spring for holding the valve closed and a supporting member projecting into the cylinder, a piston sliding in the cylinder, the head of the piston being recessed to accommodate the inlet valve supporting member when the piston is in the top dead centre position, and at least one automatic transfer valve arranged within the recess in the piston head, having a valve closure member in the form of a relatively thin light weight disc and a spring for holding the valve closed, the piston head being formed with a plurality of transfer passages leading from the recess behind the transfer valve to the second stage of compression.

2. A gas compressor as claimed in claim 1, and in which the transfer passages in the piston head are inclined to the normal to the cylinder wall, so as to give a swirling effect in the transferred gas.

3. In a gas compressor as claimed in claim 1, the combination of a valve block mounted in the cylinder head and having a plurality of holes passing through it, two annular seating rings on the surface of the valve block, the holes being located between the two rings, an annular inlet valve plate seating on said rings in the closed position, a tapered coil spring, the larger end of which bears against the valve plate between the two rings but on the opposite side of the plate, a member passing through the annular valve plate and secured to the valve block and a recessed shoulder on said member, in the recess of which is located the smaller end of the spring, said shoulder coming against the inner part of the surface of the valve plate in the fully open position, the outer edge of the plate being unrestrained so that the plate may flex in order to avoid damage thereto.

4. In a gas compressor as claimed in claim 1, at least one transfer valve, comprising an annular valve seat, a circular valve plate extending beyond the valve seat and having its edge shaped to allow for passage of air past the edge of the plate while the valve is open, a housing surrounding and guiding the plate, a tapered coil spring the wider end of which abuts against the valve plate, a dome-shape projection on the piston body extending through and supporting the narrow end of the spring and forming a stop for the centre of the valve plate in the fully open position, the outer part of the plate being left free.

5. In a gas compressor as claimed in claim 1, a device comprising a piston, prongs thereon touching the inlet valve plate, a spring for urging the piston away from the valve plate, and means for admitting compressed air to the piston, to move it against the pressure of the spring and hold the inlet valve plate off its seat for "off-loading" the compressor.

JOSEPH ANTHONY HUNT.
ALBERT EDMUND MOREILLON.

REFERENCES CITED

The following references are of record in the file of this patent:

UNITED STATES PATENTS

| Number | Name | Date |
| --- | --- | --- |
| 466,432 | Shortt | Jan. 5, 1892 |
| 474,034 | Teal | May 3, 1892 |
| 2,041,717 | Lamberton | May 26, 1936 |